United States Patent [19]

Dissett et al.

[11] Patent Number: 5,048,657
[45] Date of Patent: Sep. 17, 1991

[54] CENTRIFUGAL CLUTCH WITH VIBRATION DAMPENING MEANS

[75] Inventors: Walter L. Dissett, Southfield; James R. Bawks, Mt. Clemens, both of Mich.; Terry L. Kent, Conover, N.C.

[73] Assignee: Dyneer Corporation, Scottsdale, Ariz.

[21] Appl. No.: 456,488

[22] Filed: Dec. 26, 1989

[51] Int. Cl.⁵ .................. F16D 23/10; F16D 3/14
[52] U.S. Cl. .................. 192/105 CD; 192/30 V; 192/106.1; 192/103 B; 192/104 B; 464/85
[58] Field of Search ............ 192/30 V, 103 B, 104 B, 192/105 CD, 106.1; 74/661; 464/85, 90, 92

[56] References Cited

U.S. PATENT DOCUMENTS

| | | | |
|---|---|---|---|
| 2,626,034 | 1/1953 | Fawick | 192/105 R |
| 2,801,724 | 8/1957 | Sproul | 192/105 CD |
| 3,000,480 | 9/1961 | Bochory | 192/105 CD |
| 3,418,827 | 12/1968 | Bernard | 464/85 |
| 3,512,373 | 5/1970 | White | 192/105 CD |
| 3,534,839 | 10/1970 | Campbell et al. | 192/79 |
| 3,557,573 | 1/1971 | Hansgen | 64/13 |
| 3,565,223 | 2/1971 | Pierce | 192/106.1 |
| 3,752,279 | 8/1973 | Briar | 192/106.1 |
| 3,774,739 | 11/1973 | Higuchi | 192/106.1 |
| 3,941,012 | 3/1976 | Mayer | 74/661 |
| 4,270,645 | 6/1981 | Beccaris | 192/106.1 |
| 4,616,743 | 10/1986 | Havemann | 192/105 BA |
| 4,693,354 | 9/1987 | Umeyama et al. | 192/106.1 |
| 4,718,526 | 1/1988 | Koitabashi | 192/35 |

Primary Examiner—Allan D. Herrmann
Assistant Examiner—Nicholas Whitelaw
Attorney, Agent, or Firm—Laubscher, Presta & Laubscher

[57] ABSTRACT

A centrifugal clutch apparatus includes an annular adapter assembly adapted for colinear connection with a rotatable driving member, an independent pulley member connected with a colinearly arranged driven member having an annular portion extending toward the adapter assembly, and centrifugal weight members connected with the adapter assembly for engagement with the inner surface of the annular portion when the rotational velocity of the driving member exceeds a given value, the adapter assembly including at least one vibration dampening device including an annular resilient member connected between annular inner and outer concentrically-arranged portions of the adapter assembly for isolating the centrifugal weight members from the driving member.

4 Claims, 3 Drawing Sheets

CENTRIFUGAL CLUTCH WITH VIBRATION DAMPENING MEANS

STATEMENT OF THE INVENTION

This invention relates to a centrifugal clutch apparatus including independent annular adapter assembly means and pulley housing means connected with axially-aligned driving and driven shafts, respectively, and a plurality of velocity-responsive weight members connected with the adapter assembly for frictional engagement with the inner surface of an annular portion of said housing means, vibration dampener means being provided for isolating said weight members from driving shaft vibrations and for compensating for any misalignment between the driving and driven shafts.

BRIEF DESCRIPTION OF THE PRIOR ART

As evidenced, for example, by the Havemann U.S. Pat. No. 4,616,743, it is known in the refrigeration vehicle art to provide a refrigeration compressor that is alternately driven by the main internal combustion engine of the vehicle, or by an auxiliary electric motor or the like, use being made of rotational-velocity-responsive centrifugal clutch means for connecting together the driving and driven shafts. Note also the patent to Mayer U.S. Pat. No. 3,941,012. Dampening means have been proposed for inclusion in clutch systems broadly, as shown, for example, by the patents to Beccaris U.S. Pat. No. 4,270,645, Campbell et al U.S. Pat. No. 3,534,839, Koitabashi U.S. Pat. No. 4,718,526 and Umeyama et al U.S. Pat. No. 4,693,354. The provision of resilient components, such as bushings, in centrifugal clutches has been proposed in the patents to Fawick U.S. Pat. No. 2,626,034 and Sproul U.S. Pat. No. 2,801,724, and the use of elastic couplings in shaft connections is shown by the Hansgen U.S. Pat. No. 3,557,573.

One problem of the known centrifugal clutch systems is that when a customer wishes to install the same, he must normally remove the flywheel housing and the flywheel from the engine, bore a number of holes in the flywheel, press bushings into the bored holes, and reassemble the flywheel housing. This installation procedure is thus very time-consuming and costly. Moreover, in the prior arrangements, costly bearings must be provided between the rotor assembly and the pulley housing, thereby further increasing the cost of the apparatus. Finally, in the prior systems, it is difficult to provide vibration dampening means for reducing engine torque spikes that are transmitted through the centrifugal clutch to the compressor.

The present invention was developed to avoid the above and other drawbacks of the known centrifugal clutch apparatus.

SUMMARY OF THE INVENTION

According to the present invention, a centrifugal clutch is provided having a rotor adapter assembly that is adapted for mounting directly on the driving member (specifically, a flywheel), a pulley housing adapted for mounting on the driven member (such as a compressor shaft) completely independently of the adapter assembly, said housing having an annular portion that extends axially and colinearly toward the adapter assembly, and centrifugal weight means connected with the adapter assembly for frictional cooperation with the inner surface of the annular portion, thereby to connect the adapter assembly with the housing when the rotational velocity of the driving shaft exceeds a given value, vibration dampening means being connected between the centrifugal weight members and the driving member.

According to a more specific object of the invention, the adapter assembly includes outer and inner annular concentrically spaced members, and said vibration dampening means comprises a resilient annular member (i.e. a "spring" member) connected concentrically between said inner and outer annular members, said centrifugal clutch weight members being mounted on said inner annular member.

According to a further object of the invention, the pulley housing includes a hub portion that extends axially in concentrically spaced relation relative to said annular portion, said hub portion being connected with the driven shaft (for example, the shaft of a refrigeration compressor). For the sake of compactness, the hub portion of said pulley member extends concentrically within—and independently of—said adapter assembly inner member. Thus, when the rotational velocity of the main driving member is less than the predetermined velocity, the refrigeration compressor may be independently driven by an auxiliary electric motor or the like via drive belt means in engagement with the pulley housing.

The present invention offers the advantages that the components can be directly assembled without any reworking of an existing production engine, and the necessity of bearing means between the rotor assembly and pulley housing is eliminated, thereby reducing installation and production costs. A further advantage resides in the increase in the life of the friction shoes that results from the reduction in the eccentricity of the engine flywheel and the compressor shaft. Owing to the resilient annular dampening means, the life of the compressor is increased owing to the dampening of the torque spikes before they reach the compressor.

BRIEF DESCRIPTION OF THE DRAWINGS

Other objects and advantages of the invention will become apparent from a study of the following specification when viewed in the light of the accompanying drawings in which.

DETAILED DESCRIPTION

Figure 1:
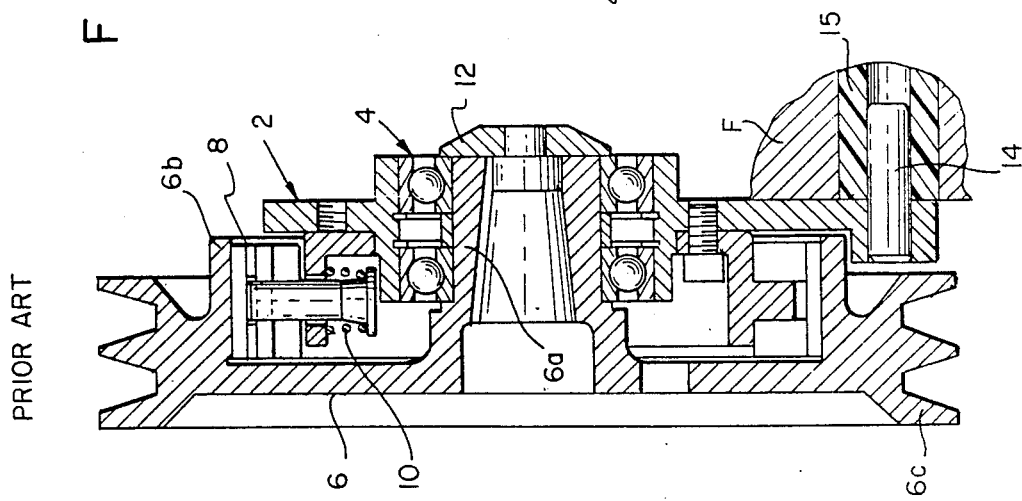
FIG. 1 is a sectional view of a centrifugal clutch of the prior art.

Referring first more particularly to the centrifugal clutch of the prior art shown in FIG. 1, the rotor assembly 2 is adapted for mounting on a flywheel F which is attached to the crankshaft of the engine, such as a diesel internal combustion engine. Journalled within the center opening of the annular rotor assembly by means of ball bearings 4 is the hub portion 6a of a pulley housing 6. The pulley housing 6 has an annular portion 6b that extends axially toward the rotor assembly 2, and an outer circumferential portion 6c which contains grooves for receiving the drive belt means from an auxiliary drive motor, not shown. A plurality of centrifugal weight members 8 are mounted on the rotor means 2 for frictionally engaging the inner surface of the annular portion 6b of the pulley housing 6 when the rotational velocity of the drive shaft which drives the rotor 2 exceeds a given value. In the illustrated embodiment, the weight members are mounted for radial movement relative to the rotor member 2 against the radially inwardly directed biasing force applied by coil springs 10. The pulley housing 6 is bolted to the end of the compressor shaft by bolt means (not shown) that extend through the washer 12 in the manner described below, and the rotor member 2 is fastened to the flywheel F by dowel pin 14 and resilient bushing 15.

Figure 2:
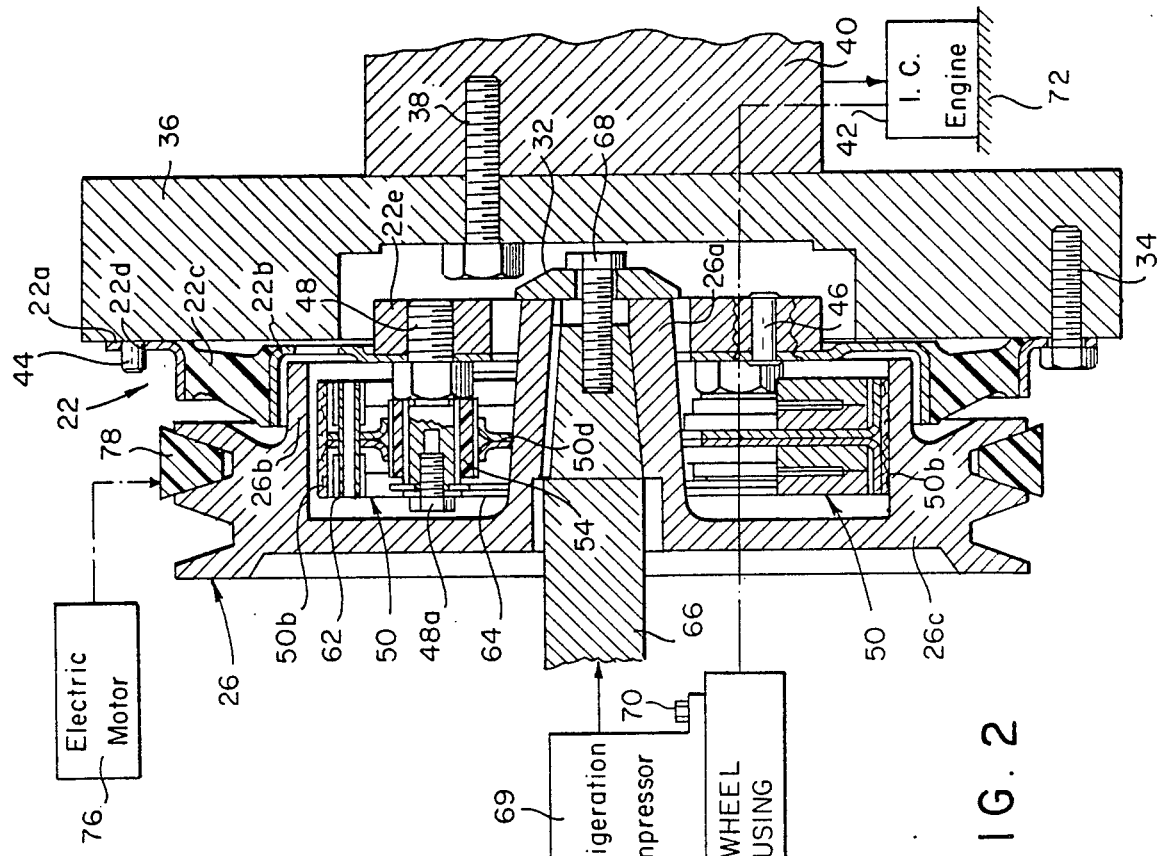
FIG. 2 is a sectional view of the centrifugal clutch of the present invention taken along line 2—2 of FIG. 3.
Figure 4:
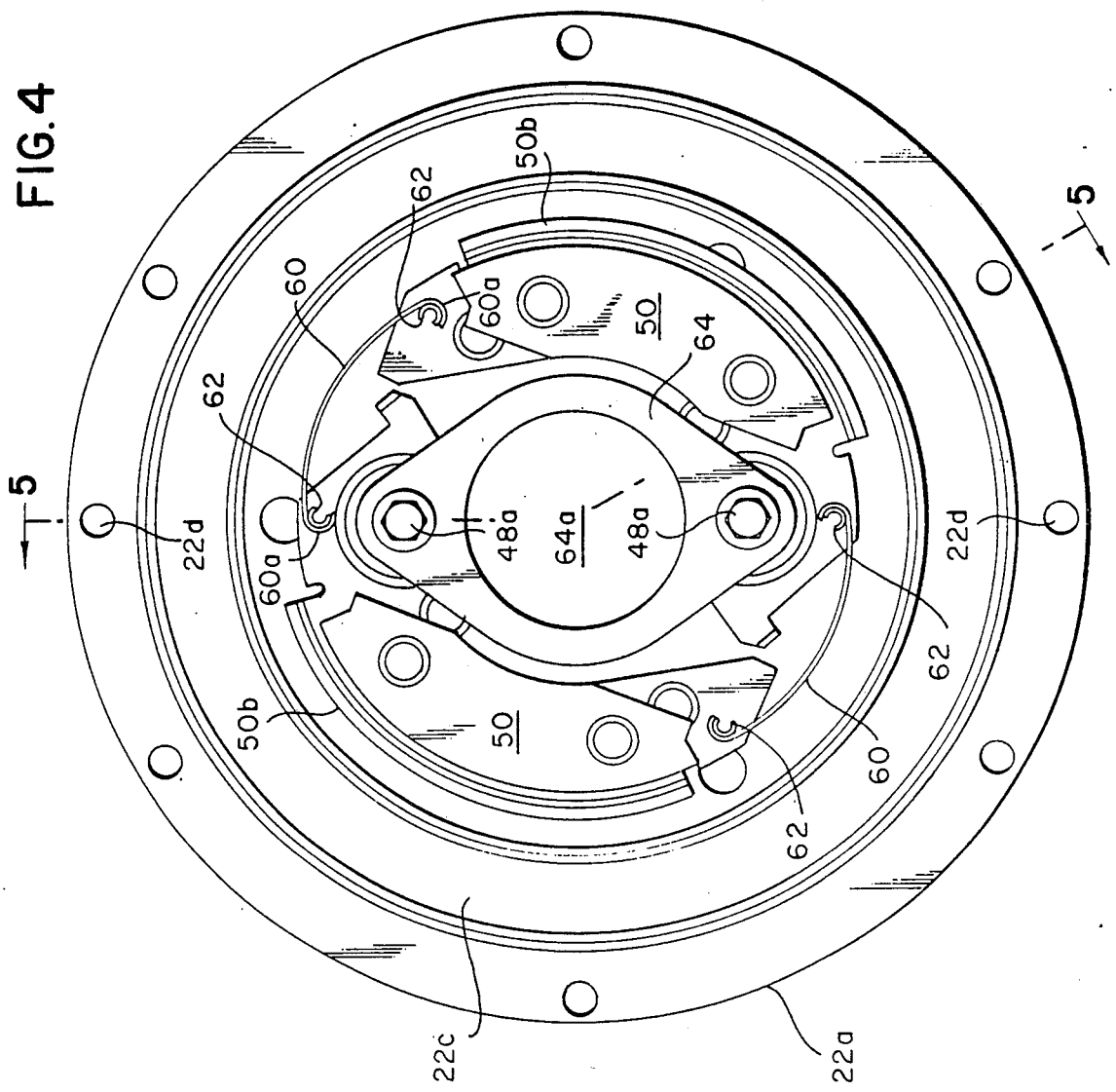
FIG. 4 is a left hand end view of the adapter assembly of FIG. 2.
Figure 5:
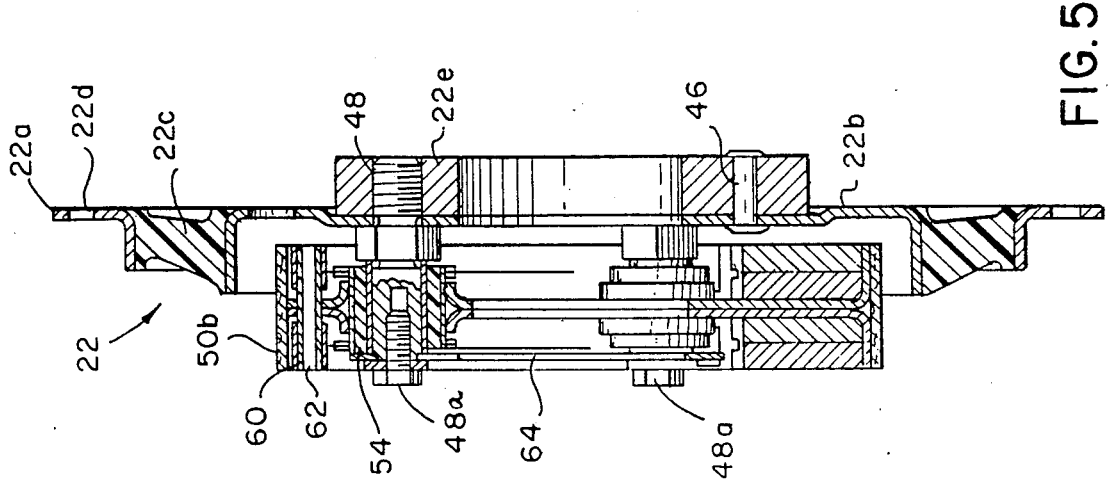
FIG. 5 is a sectional view taken along line 5—5 of FIG. 4.
Figure 3:
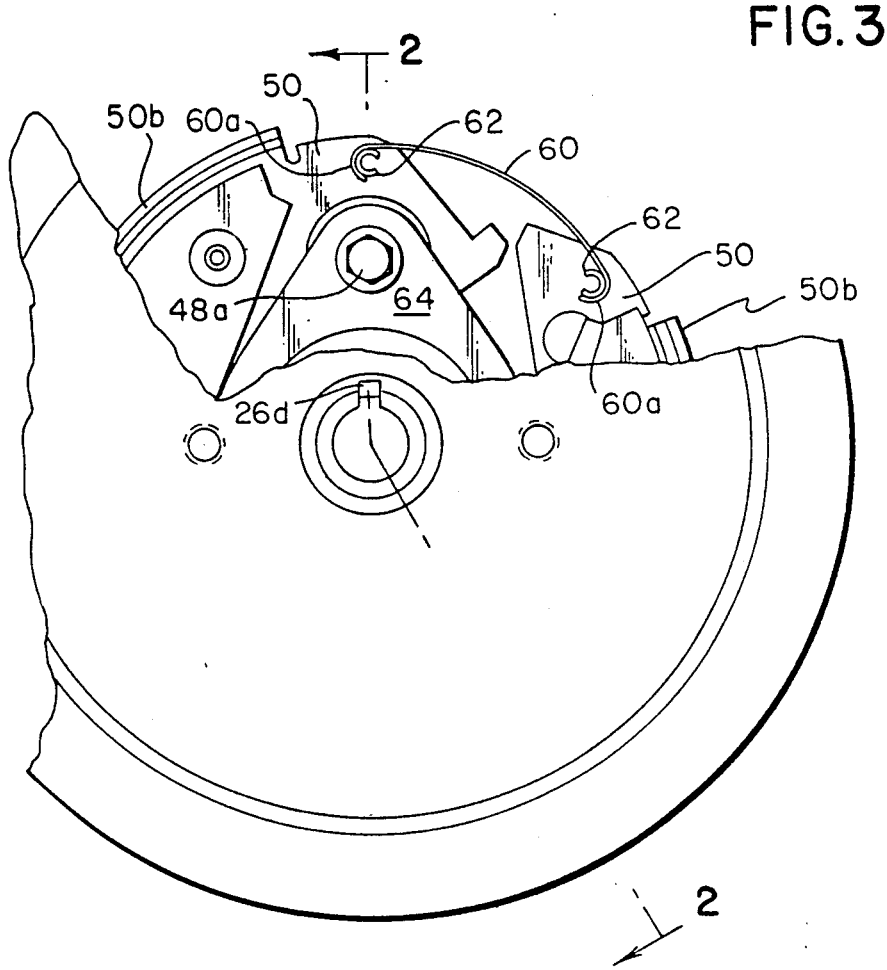
FIG. 3 is a left-hand end view, with certain parts broken away, of the apparatus of FIG. 2.
Figure 6:
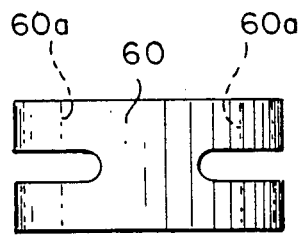
FIGS. 6 and 7 top plan and side elevation views, respectively, of one of the leaf springs in the apparatus of FIG. 4.
Figure 8:
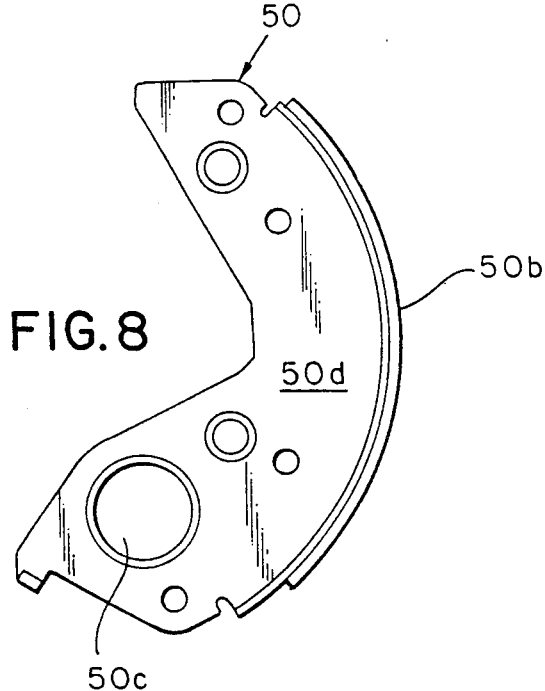
FIG. 8 is an elevational view of one of the centrifugal weight members.
Figure 7:
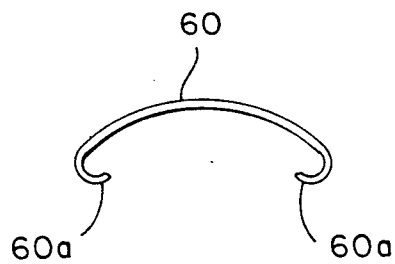

Referring now to the centrifugal clutch of the present invention illustrated in FIG. 2, the rotor assembly 22 includes an outer annular member 22a that is adapted to be bolted by bolts 34 to the flywheel 36 which in turn is bolted by bolts 38 to the crankshaft 40 of an internal combustion engine 42, such as a diesel engine. The rotor or adaptor assembly 22 includes also an inner annular member 22b that is arranged in concentrically spaced relation within the outer member 22a, said inner and outer members being connected by an intermediate annular resilient vibration dampening member 22c. The vibration dampening member (or "spring")—which is formed from a suitable resilient synthetic plastic material (such as SBR obtained from Simpson Industries, for example)—is rigidly bonded (for example, by a phenolic resin) to both the outer and inner adapter members 22a and 22b, respectively. Locator pins 44 extend through diametrically arranged locator openings 22d that are formed in the outer adaptor member 22a, as shown in FIG. 4, thereby to properly orient the rotor adaptor assembly 22 relative to the flywheel 36 prior to connection thereto by the bolts 34. Rigidly connected with the face of the inner member 22b adjacent the flywheel 36 by rivets 46 (or by spot welding) is an annular connecting plate 22e. Threadably connected at their one ends to the inner adaptor member 22b are a pair of diametrically arranged pivots shafts 48 to which a pair of centrifugal weight members 50 are pivotally connected, respectively. Each of the weight members 50 is provided with a friction shoe portion 50b that is adapted to frictionally engage the inner surface of annular portion 26b of pulley housing 26 when the rotational velocity of the drive shaft 40 exceeds a given value. More particularly, the pivot shaft 48 is provided with a resilient bushing 54 (as best shown in FIG. 5) that is mounted within an opening 50c of the weight member 50d, as shown in FIG. 8. Leaf springs 60 are bifurcated at each end for connection between the adjacent ends of the weight member 50 by transverse pins 62 (FIG. 3) that extend within the bent end portions 60a (FIG. 7)of the leaf springs, as shown in FIG. 3. A stabilizing or bridge plate 64 having a central opening 64a (FIG. 4) is connected between the free ends of the pivot shafts 48 by mounting bolts 48a, as shown in FIGS. 4 and 5.

The hub portion 26a is internally tapered to receive the corresponding end of the refrigeration compressor shaft 66, as shown in FIG. 2. Bolt 68 extends through washer 32 for threaded connection with the end of the compressor shaft 66, thereby to rigidly secure the pulley housing 26 with the compressor shaft 66. The compressor shaft is keyed to the pulley housing 26a by key means including key slot 26d, as best shown in FIG. 3. The refrigeration compressor housing 69 is bolted by bolts 70 to the flywheel housing 42a of the internal combustion engine 42. When the velocity of rotation of the driving shaft is less than a predetermined value, the centrifugal weight members 50 are disengaged from the annular portion 26b of the pulley 26, and consequently the pulley housing 26 may be driven by auxiliary electric motor 76 (FIG. 2) via drive belt means 78.

Since the centrifugal clutch of the present invention does not include bearing means (such as the ball bearing means 4 of FIG. 1) for connecting the pulley housing 26 with the adapter assembly 22, the two units are completely independent of each other. Thus, in order to install or repair the centrifugal clutch assembly, the bolts 70 may be removed to permit displacement of the refrigeration compressor, the shaft 66, and the pulley housing 26 relative to the rotor adaptor assembly 22, the flywheel 36, the drive shaft 40, and the internal combustion engine 42. The vibration dampening member 22c of the adaptor assembly 22 isolates the centrifugal weight members 50 and the inner adaptor member 22b from the torque variations produced by the driving shaft 40, and consequently serve to isolate the torque spikes of the driving shaft from the refrigeration compressor 68. Furthermore, the vibration dampener member 22c allows for the misalignment between the compressor shaft 66 and the flywheel 36.

OPERATION

In operation, when the rotational velocity of the driving shaft 40 increases beyond a predetermined value, the weight members 50 pivot outwardly relative to their pivot shafts 48, thereby to effect frictional engagement between the frictional shoes 50b and the inner periphery of the annular portion 26b of the pulley member 26. The pulley housing member 26 and the compressor shaft 66 are thereby driven directly by the driving shaft 40, whereby the refrigeration compressor is driven by the internal combustion engine 42.

In the event that the rotational velocity of the internal combustion engine is less than the predetermined value, the pulley housing 26 is disengaged from the adaptor assembly 22, the flywheel 36, and the driving shaft 40, whereupon the refrigeration compressor may be driven by the electric motor 76 via drive belt means 78.

While, in the accordance with the provisions of the Patent Statutes, the preferred forms and embodiments of the invention have been illustrated and described, it will be apparent to those skilled in the art that various changes and modifications may be made without deviating from the concepts described above.

What is claimed is:
1. Centrifugal clutch means comprising:
 (a) internal combustion engine drive means (72) including a flywheel (36);
 (b) a refrigeration compressor (69) having a driven shaft (66);
 (c) an adapter assembly (22) arranged colinearly intermediate said driven shaft and said flywheel, and including:
  (1) a rigid annular outer member (22a);
  (2) a rigid annular inner member (22b) arranged in concentrically spaced relation within said outer member;

(3) resilient means (22c) connecting said inner member with said outer member and operable to dampen relative vibrational movement therebetween, said resilient means consisting of a continuous annular resilient member arranged concentrically between and connected to said inner and outer annular members; and (4) means including a plurality of circumferentially spaced bolts (34) connecting said annular outer member with said flywheel;

(d) a generally cylindrical pulley housing (26) arranged colinearly between said adapter assembly and said driven shaft, said housing including:

(1) a first portion (26a) connected with said compressor driven shaft;

(2) an annular second portion (26b) extending coaxially relative to the axis of said pulley housing toward said adapter assembly;

(3) said pulley housing and said adapter assembly being completely independent of each other, whereby the use of ball bearing connecting means is avoided, and (4) a pulley belt portion (26c) including cylindrical belt-receiving means arranged concentrically at least partially about said annular portion; and (e) centrifugal clutch means operable to connect said adapter assembly with said pulley housing when the rotational velocity of said flywheel exceeds a given value, said centrifugal clutch means including a plurality of rotational velocity-responsive weight members (50) movably connected with said adapter assembly inner member and extending within said pulley housing annular portion for frictional cooperation with the inner surfaces thereof, whereby when the rotational velocity of the flywheel is less than said given value, said pulley housing is disconnected from said adapter assembly to permit driving of the pulley housing by an auxiliary motor via drive belt means connected with said pulley belt portion.

2. Apparatus as defined in claim 1, wherein said friction members are pivotally connected at one end with said inner member, said weight members each including a friction shoe pad that is operable to engage the inner surface of said pulley housing annular portion; and further including spring means biasing said weight members inwardly away from engagement with said annular portion inner surface.

3. Apparatus as defined in claim 2, wherein said inner member is provided with a plurality of axially extending pivot shafts (48) about which said weight members pivot, respectively, and further including annular resilient vibration dampening bushing means (54) arranged concentrically between said pivot shafts and said weight members, respectively, and a stabilizing plate (64) connected between said pivot shafts.

4. Apparatus as defined in claim 3, wherein each of said inner and outer members is formed by stamping from sheet metal.

* * * * *